US011926942B2

(12) United States Patent
Tsuchiya et al.

(10) Patent No.: US 11,926,942 B2
(45) Date of Patent: Mar. 12, 2024

(54) COORDINATE DATA CREATING DEVICE, SEWING MACHINE AND PROGRAM

(71) Applicant: JANOME Corporation, Hachioji (JP)

(72) Inventors: Minami Tsuchiya, Hachioji (JP); Hiromi Oda, Hachioji (JP)

(73) Assignee: JANOME Corporation, Hachioji (JP)

( * ) Notice: Subject to any disclaimer, the term of this patent is extended or adjusted under 35 U.S.C. 154(b) by 102 days.

(21) Appl. No.: 17/750,397

(22) Filed: May 23, 2022

(65) Prior Publication Data

US 2022/0403572 A1 Dec. 22, 2022

(30) Foreign Application Priority Data

Jun. 17, 2021 (JP) .................................. 2021-101037

(51) Int. Cl.
*D05B 19/08* (2006.01)
*G05B 19/042* (2006.01)

(52) U.S. Cl.
CPC .......... *D05B 19/08* (2013.01); *G05B 19/042* (2013.01); *G05B 2219/2626* (2013.01)

(58) Field of Classification Search
CPC ........ D05B 19/02; D05B 19/04; D05B 19/06; D05B 19/085; D05B 19/08; D05B 19/10; D05B 19/12; D05B 19/14; G05B 2219/2626

See application file for complete search history.

(56) References Cited

U.S. PATENT DOCUMENTS

| 4,200,049 | A | * | 4/1980 | Blessing | ................ | D05B 27/12 |
| | | | | | | 112/475.05 |
| 4,823,714 | A | * | 4/1989 | Yokoe | .................... | D05B 19/08 |
| | | | | | | 112/475.05 |
| 5,009,176 | A | | 4/1991 | Shigeta et al. | | |
| 5,692,448 | A | | 12/1997 | Shigeta | | |
| 6,161,491 | A | * | 12/2000 | Takenoya | ............... | D05B 79/00 |
| | | | | | | 112/456 |
| 6,567,721 | B1 | | 5/2003 | Endo | | |
| 6,587,745 | B1 | * | 7/2003 | Polden | ................... | D05B 19/08 |
| | | | | | | 700/138 |
| 10,995,437 | B2 | * | 5/2021 | Kongo | .................. | D05B 19/08 |

(Continued)

FOREIGN PATENT DOCUMENTS

JP 2020-5797 A 1/2020

*Primary Examiner* — Danny Worrell
(74) *Attorney, Agent, or Firm* — Yokoi & Co., U.S.A.; Toshiyuki Yokoi

(57) ABSTRACT

In an added coordinate data creating unit, when coordinate data of two sequential needle locations in a sewing order stored in a data storage unit is the coordinate data of a final needle location of one collective pattern and the coordinate data of a first needle location of another collective pattern sewn immediately after the one collective pattern, a added coordinate data creating unit is configured to create a new coordinate data by adjusting independent original values added respectively to the coordinate data of the final needle location of the one collective pattern and the coordinate data of the first needle location of the another collective pattern sewn immediately after the one collective pattern so that a connecting portion between the one collective pattern and the another collective pattern sewn immediately after the one collective pattern is connected smoothly.

5 Claims, 9 Drawing Sheets

(56) References Cited

U.S. PATENT DOCUMENTS

| | | | |
|---|---|---|---|
| 11,649,575 B2* | 5/2023 | Kongo | D05B 19/08 112/154 |
| 2007/0198119 A1* | 8/2007 | Bailie | D05B 19/08 700/138 |
| 2012/0073484 A1* | 3/2012 | Nakamura | D05B 47/04 112/154 |
| 2013/0190916 A1* | 7/2013 | Schnaufer | D05B 19/12 700/137 |
| 2016/0069007 A1* | 3/2016 | Kongo | D05B 19/08 112/102.5 |
| 2020/0010990 A1 | 1/2020 | Kongo | |

* cited by examiner

COORDINATE DATA CREATING DEVICE, SEWING MACHINE AND PROGRAM

CROSS-REFERENCES TO RELATED APPLICATIONS

This patent specification is based on Japanese patent application, No. 2021-101037 filed on Jun. 17, 2021 in the Japan Patent Office, the entire contents of which are incorporated by reference herein.

BACKGROUND OF THE INVENTION

1. Field of the Invention

The present invention is related to a coordinate data creating device, a sewing machine and a program.

2. Description of the Related Art

In general, the positions of seams of a sewing machine are determined by an amplitude position of a needle and a feeding amount of a fabric.

Thus, a pattern is formed by connecting needle location points with each other by threads.

Here, the data is inputted by determining the positions of the needle to be lowered one by one for each stitch based on the drawing to be sewn.

Namely, the sewing data is basically created for faithfully reproducing the original drawing on the seams in many cases.

Thus, the original drawing can be drawn by the seams by connecting the needle location points in straight lines in accordance with the sewing data.

Therefore, the pattern can be faithfully reproduced by anyone by using the sewing machine, and good-looking pattern can be formed on the fabric as if the pattern is sewn by an expert.

However, on the contrary, the above described fact gives mechanical and cool impression.

Considering the above described problem, Patent Document 1 discloses the technology of creating a hand-drawn taste in the sewing pattern by adding an appropriate fluctuation for each stitch to form the seam imparting comfort and warmth.

Furthermore, in the technology described in Patent Document 1, it is possible to deform the pattern into a hand-drawn taste while keeping an original shape by adding the same fluctuation to the coordinate data having the same coordinate even when the sewing order of the needle location is different.

[Patent Document 1] Japanese Unexamined Patent Application Publication No. 2020-5797

BRIEF SUMMARY OF THE INVENTION

In the technology described in Patent Document 1, a fluctuation is added to the original needle location points.

However, for example, when the needle is operated between two points connecting one collective pattern and another collective pattern and the directions (polarities) of the random number are opposite to each other (in the direction separated from each other) between the coordinate of the final needle location point of the one collective pattern and the coordinate of the first needle location point of the next collective pattern, the connection between the patterns may be unnatural in some cases since the needle is operated in the opposite direction.

Furthermore, the above described phenomenon is particular when the distance between the coordinate of the final needle location point of the one collective pattern and the coordinate of the first needle location point of the next collective pattern is a predetermined distance or more.

The present invention provids a coordinate data creating device, a sewing machine and a program capable of creating a hand-drawn taste in the sewing pattern by adding an appropriate fluctuation for each stitch to form the seam imparting comfort and warmth and creating the combination pattern formed of a plurality of collective patterns while a connecting portion between the plurality of collective patterns is naturally fluctuated.

Embodiment 1: One or more embodiments of the present invention propose a coordinate data creating device of a sewing machine for creating coordinate data composed of an X-coordinate value and a Y-coordinate value of a needle location of a pattern to be sewn, the coordinate data creating device including: a data storage unit configured to store a sewing order and the coordinate data of the needle location in association with each other; and an added coordinate data creating unit configured to create a new coordinate data by adding independent original values to the X-coordinate value or the Y-coordinate value in each of the coordinate data stored in the data storage unit, wherein when the coordinate data of two sequential needle locations in the sewing order stored in the data storage unit is the coordinate data of a final needle location of one collective pattern and the coordinate data of a first needle location of another collective pattern sewn immediately after the one collective pattern, the added coordinate data creating unit is configured to create the new coordinate data by adjusting the independent original values added respectively to the coordinate data of the final needle location of the one collective pattern and the coordinate data of the first needle location of the another collective pattern sewn immediately after the one collective pattern so that a connecting portion between the one collective pattern and the another collective pattern sewn immediately after the one collective pattern is connected smoothly.

Embodiment 2: One or more embodiments of the present invention propose the coordinate data creating device wherein the added coordinate data creating unit is configured to adjust an independent original value added to Y-coordinate value in the independent original values.

Embodiment 3: One or more embodiments of the present invention propose the coordinate data creating device further including a setting unit configured to set the independent original values so that the connecting portion between the one collective pattern and the another collective pattern sewn immediately after the one collective pattern is connected smoothly.

Embodiment 4: One or more embodiments of the present invention propose a sewing machine having the coordinate data creating device according to any one of the embodiments 1 to 3.

Embodiment 5: One or more embodiments of the present invention propose a program for executing a coordinate data creating method of a coordinate data creating device of a sewing machine for creating coordinate data composed of an X-coordinate value and a Y-coordinate value of a needle location of a pattern to be sewn, the coordinate data creating device including: a data storage unit configured to store a sewing order and the coordinate data of the needle location in association with each other; and an added coordinate data creating unit configured to create a new coordinate data by adding independent original values to the X-coordinate value or the Y-coordinate value in each of the coordinate data stored in the data storage unit, wherein when the coordinate data of two sequential needle locations in the sewing order stored in the data storage unit is the coordinate data of a final needle location of one collective pattern and the coordinate data of a first needle location of another collective pattern sewn immediately after the one collective pattern, the added coordinate data creating unit is configured to create the new coordinate data by adjusting the independent original values added respectively to the coordinate data of the final needle location of the one collective pattern and the coordinate data of the first needle location of the another collective pattern sewn immediately after the one collective pattern so that a connecting portion between the one collective pattern and the another collective pattern sewn immediately after the one collective pattern is connected smoothly.

One or more embodiments of the present invention have an effect that a hand-drawn taste can be created in the sewing pattern by adding an appropriate fluctuation for each stitch to form the seam imparting comfort and warmth and the combination pattern formed of a plurality of collective patterns can be created while a connecting portion between the plurality of collective patterns is naturally fluctuated.

DETAILED DESCRIPTION OF THE INVENTION

Embodiments

Hereafter, the embodiments of the present invention will be explained using FIG. 1 to FIG. 4.

<Electrical Configuration of Coordinate Data Creating Device 10>

An electrical configuration of a coordinate data creating device 10 concerning the present embodiment will be explained using FIG. 1.

Figure 1:
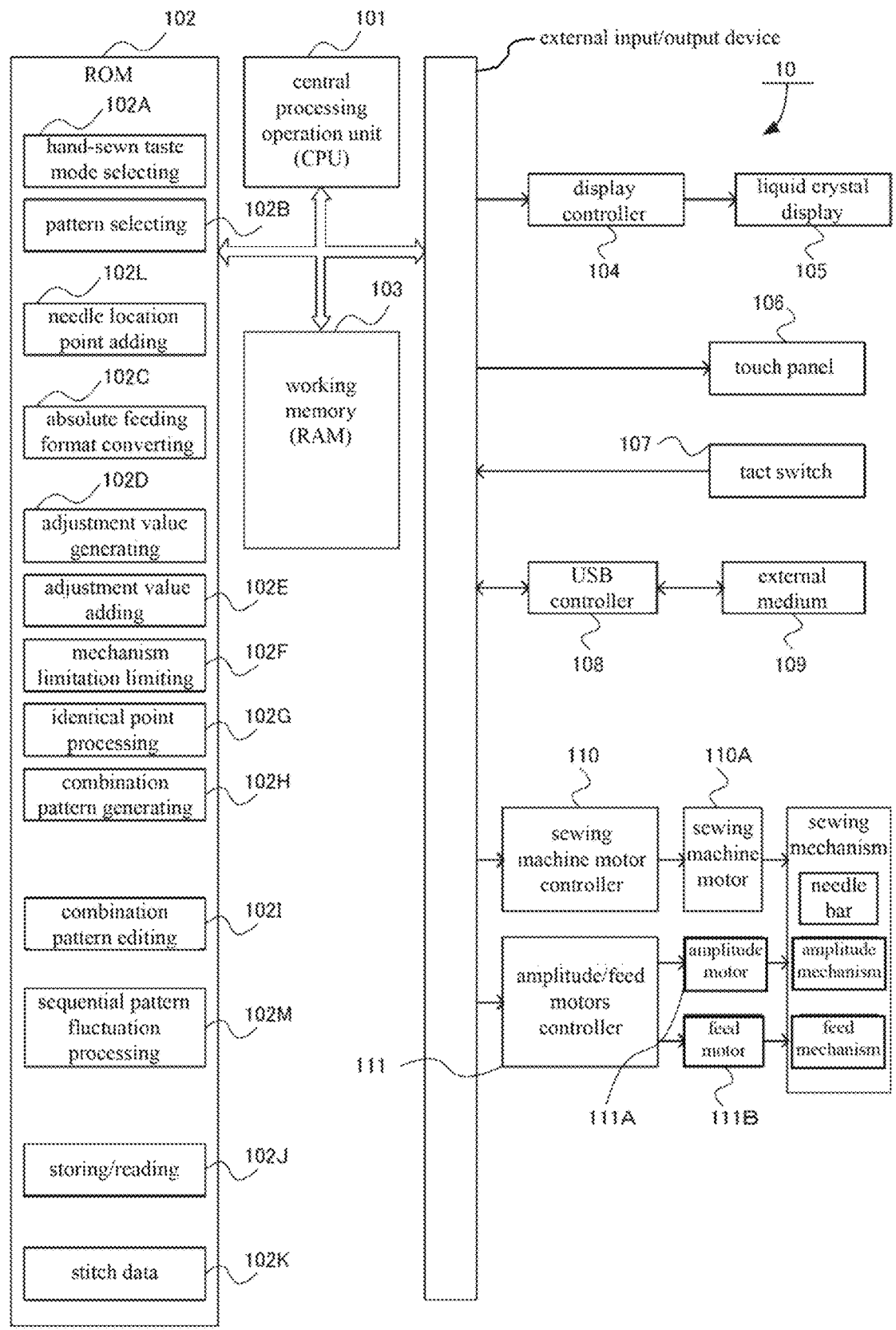
FIG. 1 is a block diagram showing an electrical configuration of a coordinate data creating device concerning an embodiment of the present invention.

As shown in FIG. 1, the coordinate data creating device 10 concerning the present embodiment is configured to include a central processing operation unit (CPU) 101, a ROM 102, a working memory (RAM) 103, a display controller 104, a liquid crystal display 105, a touch panel 106, a tact switch 107, a USB controller 108, an external medium 109, a sewing machine motor controller 110, an amplitude/feed motors controller 111, a sewing machine motor 110A, an amplitude motor 111A and a feed motor 111B.

The central processing operation unit (CPU) 101 controls the operations of the entire coordinate data creating device 10 in accordance with control programs stored in the ROM 102.

In addition, the central processing unit (CPU) 101 is connected with various devices via an external input/output device.

The ROM 102 is mainly functions as a storage unit for storing stitch data and functional modules in the present embodiment.

The RAM 103 mainly functions as a working memory for temporarily storing working data and the like in the present embodiment.

The ROM 102 stores various functional modules and data such as a hand-sewn taste mode selecting module 102A, a pattern selecting module 102B, an absolute feeding format converting module 102C, an adjustment value generating module 102D, an adjustment value adding module 102E, a mechanism limitation limiting module 102F, an identical point processing module 102G, a combination pattern generating module 102H, a combination pattern editing module 102I, a storing/reading module 102J, a stitch data 102K storing area, a needle location point adding module 102L and a sequential pattern fluctuation processing module 102M.

Figure 3:
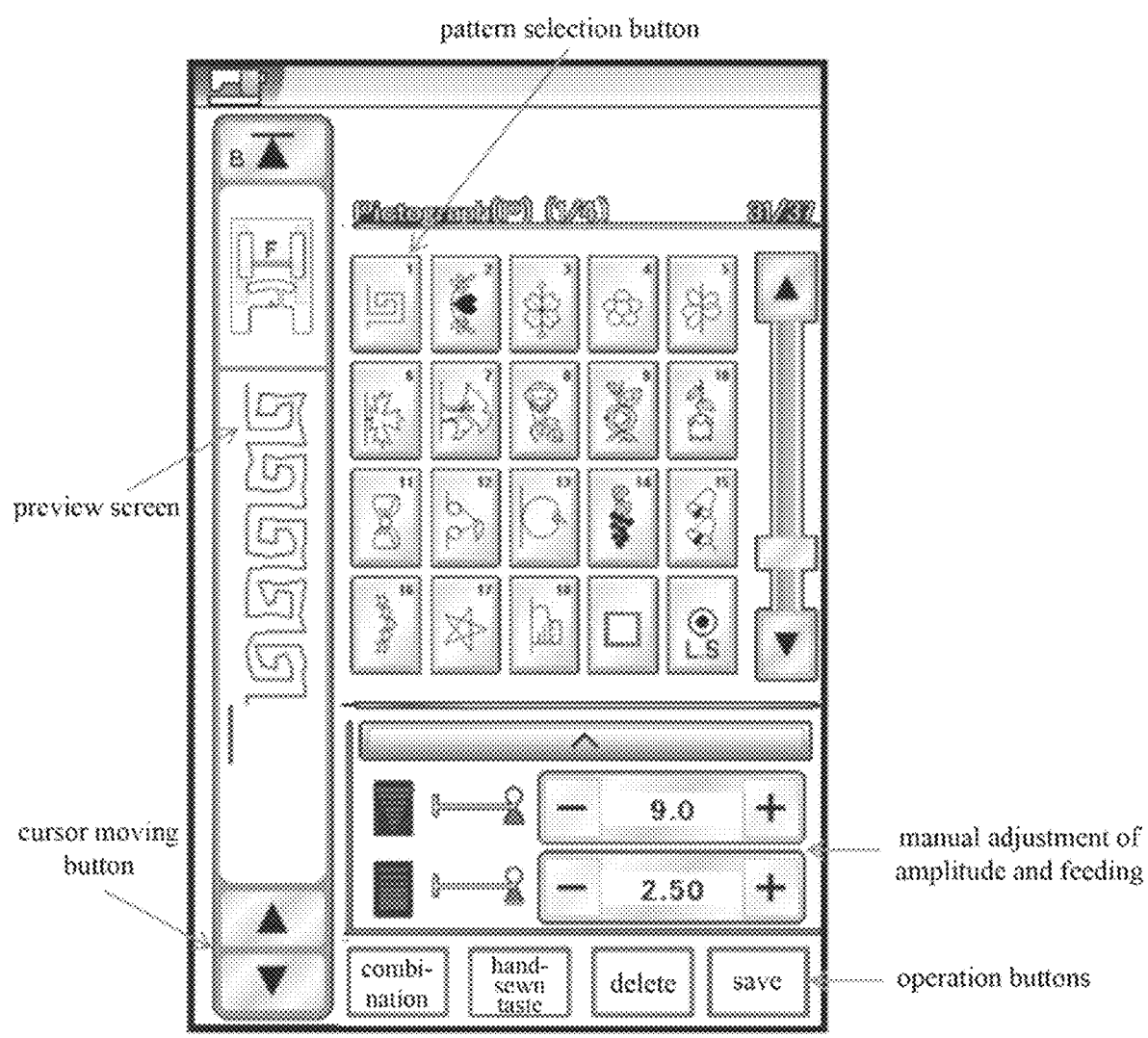
FIG. 3 is a drawing illustrating the operation screen operated in the coordinate data creating device concerning an embodiment of the present invention.

The hand-sewn taste mode selecting module 102A is a module enabled when a user presses "hand-sewn taste" button of the operation screen displayed on the liquid crystal display 105 shown in FIG. 3. Thus, a stitch data 102K is finely adjusted by a hand-drawn taste stitch conversion function for the patterns selected after that.

The pattern selecting module 102B is a module for reading one stitch of the stitch data 102K when the user presses No. 1 button in "pattern selection" buttons of the operation screen in the liquid crystal display 105 shown in FIG. 3, for example. Thus, the stich of the stitch number 1 incorporated in the ROM 102 of the sewing machine is selected.

The absolute feeding format converting module 102C is a module for accumulating a relative amount of the stitch data 102K, which is a relative feeding amount, and converting it into the data of an absolute coordinate.

The adjustment value generating module 102D is a module for converting the random value of the integer into the unit of length with 0.1 millimeter unit and generating the adjustment value when the user operates the pattern selection operation by the pattern selecting module 102B.

Note that the adjustment value corresponding to the coordinate data of a newly created needle location position (needle location point) created in the later described needle location point adding module 102L is also generated.

The adjustment value adding module 102E is a module for adding the adjustment value generated by the adjustment value generating module 102D to the original amplitude value and absolute feeding data.

Note that the corresponding adjustment value generated in the adjustment value generating module 102D is also added to the coordinate data of a newly generated needle location generated in the later described needle location point adding module 102L.

The mechanism limitation limiting module 102F is a module enabled when the processing result processed by the adjustment value adding module 102E exceeds the limit value of the amplitude/feeding mechanism. Thus, the execution of the processing processed by the adjustment value adding module 102E is limited.

The identical point processing module 102G is a module activated when another original data exists within the same or approximate range of one original data in the original data which is the absolute coordinate data to which the adjustment value is not added. Thus, identical point processing module 102G executes the processing of identifying (matching) the coordinates after the adjustment with each other between the same or approximate coordinates in the already adjusted coordinate.

The combination pattern generating module 102H is a module for temporarily storing the data of one pattern in the working memory (RAM) 103 in a state that the hand-sewn taste processing is added to the data.

The combination pattern generating module 102H is a module for displaying one pattern converted into the hand-sewn taste on "preview screen" of the operation screen displayed on the liquid crystal display 105 shown in FIG. 3 via the display controller 104.

In addition, the combination pattern generating module 102H is a module for creating a combination pattern by finely adjusting the stitch data 102K by new random number when the user selects the same pattern again.

The combination pattern editing module 102I is a module for deleting or adding the patterns and changing the combination of the patterns.

Furthermore, the combination pattern editing module 102I is a module for finely adjusting the pattern by new random number when the pattern is added.

The storing/reading module 102J is a module for writing the combined pattern data in the external medium 109 and the like.

In addition, the storing/reading module 102J is a module for reading the combined pattern data from the external medium 109 and the like.

The needle location point adding module 102L creates the coordinate data corresponding to a new needle location between the coordinate data corresponding to two sequential needle locations in the sewing order when a distance between the two sequential needle locations in the original stitch data 102K stored in the stitch data 102K storing area of the ROM 102 (i.e., data storage unit) is longer than a predetermined distance.

The coordinate data created corresponding to a new needle location is stored in the stitch data 102K storing area of the ROM 102 (i.e., data storage unit).

Note that the "predetermined distance" can be preliminarily determined or set by the user. Here, the preliminarily determined "predetermined distance" can be 3 mm or more, for example.

The sequential pattern fluctuation processing module 102M performs the processing of controlling the direction of the random number between a plurality of collective patterns based on the coordinate data of the final needle location point (end point) of the preceding collective pattern and the coordinate data of the first needle location point (first needle) of the succeeding collective pattern.

Specifically, when the coordinate data of two sequential needle locations in the sewing order stored in the stitch data 102K storage unit in the ROM 102 (i.e., data storage unit) is the coordinate data of a final needle location of one collective pattern and the coordinate data of a first needle location of another collective pattern sewn immediately after the one collective pattern, the sequential pattern fluctuation processing module 102M creates a new coordinate data by adjusting the independent original values added respectively to the coordinate data of the final needle location of the one collective pattern and the coordinate data of the first needle location of the another collective pattern sewn immediately after the one collective pattern so that a connecting portion between the one collective pattern and the another collective pattern sewn immediately after the one collective pattern is connected smoothly.

More preferably, the sequential pattern fluctuation processing module 102M adjusts the independent original value added to Y-coordinate value in the independent original values.

It is also possible to provide a setting unit configured to set the independent original values by the user so that the connecting portion between the one collective pattern and the another collective pattern sewn immediately after the one collective pattern is connected smoothly.

Here, "collective pattern" means the pattern giving a collected (gathered, united) impression as a whole pattern. The collective pattern includes not only the pattern formed by a large number of needle location points but also the pattern formed by a small number of needle location points for connecting the patterns formed by a large number of needle location points.

Various functional modules (e.g., OS, basic library) read from the ROM 102 are temporarily stored in the RAM 103.

In addition, the data used for the operation in the central processing operation unit (CPU) 101 is also temporarily stored and saved in the RAM 103.

The display controller 104 is a device for executing the control of the display data displayed on the later described liquid crystal display 105.

The liquid crystal display 105 is a device for displaying the operation screen shown in FIG. 3, for example.

The liquid crystal display 105 is electrically connected with the central processing operation unit (CPU) 101 via the external input/output device.

In addition, the liquid crystal display 105 has a multilayer structure where the later described touch panel 106 is layered below a display surface. Thus, the touch panel 106 and the liquid crystal display 105 are unitized as "display unit."

Thus, patterns, characters, buttons and the like are displayed on the liquid crystal display 105.

The touch panel 106 is configured as a panel of a capacitance type, a resistive film type or the like. The touch panel 106 is electrically connected with the central processing operation unit (CPU) 101 via the external input/output device.

In addition, considering user's convenience, the touch panel 106 is arranged to be exposed to the outside of the coordinate data creating device 10 so as to be operable.

Therefore, the user can operate the touch panel 106 by touching the touch panel with fingers while checking the selection of a hand-sewn taste mode and the selection of the pattern on the screen.

When the user presses the tact switch 107, the instructions of starting/stopping sewing, the vertical movement of the needle, the threading (not illustrated) and the like are transferred to the central processing unit 101.

The USB (Universal Serial Bus) controller 108 connects the coordinate data creating device 10 with the external devices such as the external medium 109 and executes the control.

The external medium 109 is a hard disk, a DVD recorder or the like, for example. The external medium 109 writes and stores the pattern data or the like under the control of the USB controller 108.

The sewing machine motor controller 110 controls to drive the sewing machine motor 110A according to the command transmitted from the central processing operation unit (CPU) 101. Thus, the sewing machine motor controller 110 controls the processing of vertically moving a needle bar to form seams by a sewing needle, an upper thread and a lower thread.

The amplitude/feed motors controller 111 controls to drive the amplitude motor 111A and the feed motor 111B. Thus, the amplitude/feed motors controller 111 controls the operation of the needle bar, the feeding amount of the fabric fed by a feed dog and switching of the forward/backward operation in the sewing mechanism.

The amplitude/feed motors controller 111 controls the needle location and the feeding amount of the fabric to form the seams while changing the position of the seams. Thus, the pattern is formed.

The central processing operation unit (CPU) 101 sequentially executes the program module stored in the ROM 102 and converts the normal sewing data into the hand-sewn taste stitch data, for example.

For example, the central processing operation unit (CPU) 101 moves (displaces) the needle location points of the normal sewing stitch data in the X-direction and Y-direction by a minute distance. Thus, hand-sewn taste is created on the sewing pattern by finely adjusting all needle location points by different lengths and directions.

More specifically, the central processing operation unit (CPU) 101 generates the coordinate string of the needle location points of the sewing image from the stitch data 102K.

The central processing operation unit (CPU) 101 generates a random number, generates the adjustment value of a minute length (±1.0 mm), and add the minute length to the coordinate of the X-direction and the Y-direction of each of the needle location points.

Furthermore, when same or approximate coordinate exists in the needle location points of the original data, the central processing operation unit (CPU) 101 can execute the processing of identifying the coordinates after the adjustment with each other between the same or approximate coordinates in the already adjusted coordinate via the identical point processing module 102G Thus, the combination pattern can be created by the stitch data 102K converted into the hand-sewn taste.

Here, the approximate range is a preliminarily determined range. For example, the approximate range can be ±0.2 mm or less, for example.

It is also possible that the range of the approximate is arbitrarily changed by the user.

Note that the details of the processing will be described later.

<Processing of Coordinate data Creating Device>

Figure 2:
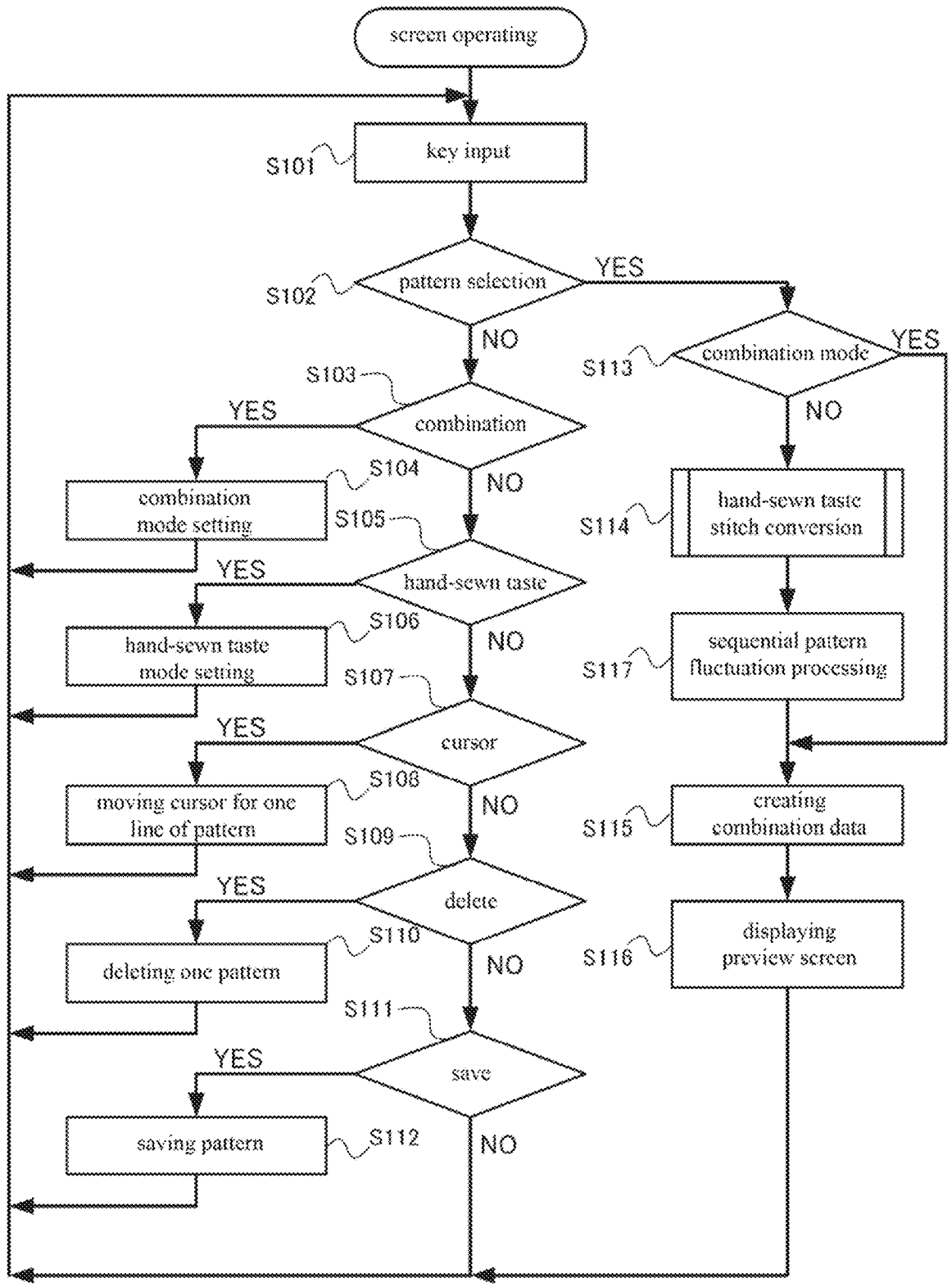
FIG. 2 is a processing flowchart for operating an operation screen of the coordinate data creating device concerning an embodiment of the present invention.
Figure 4:
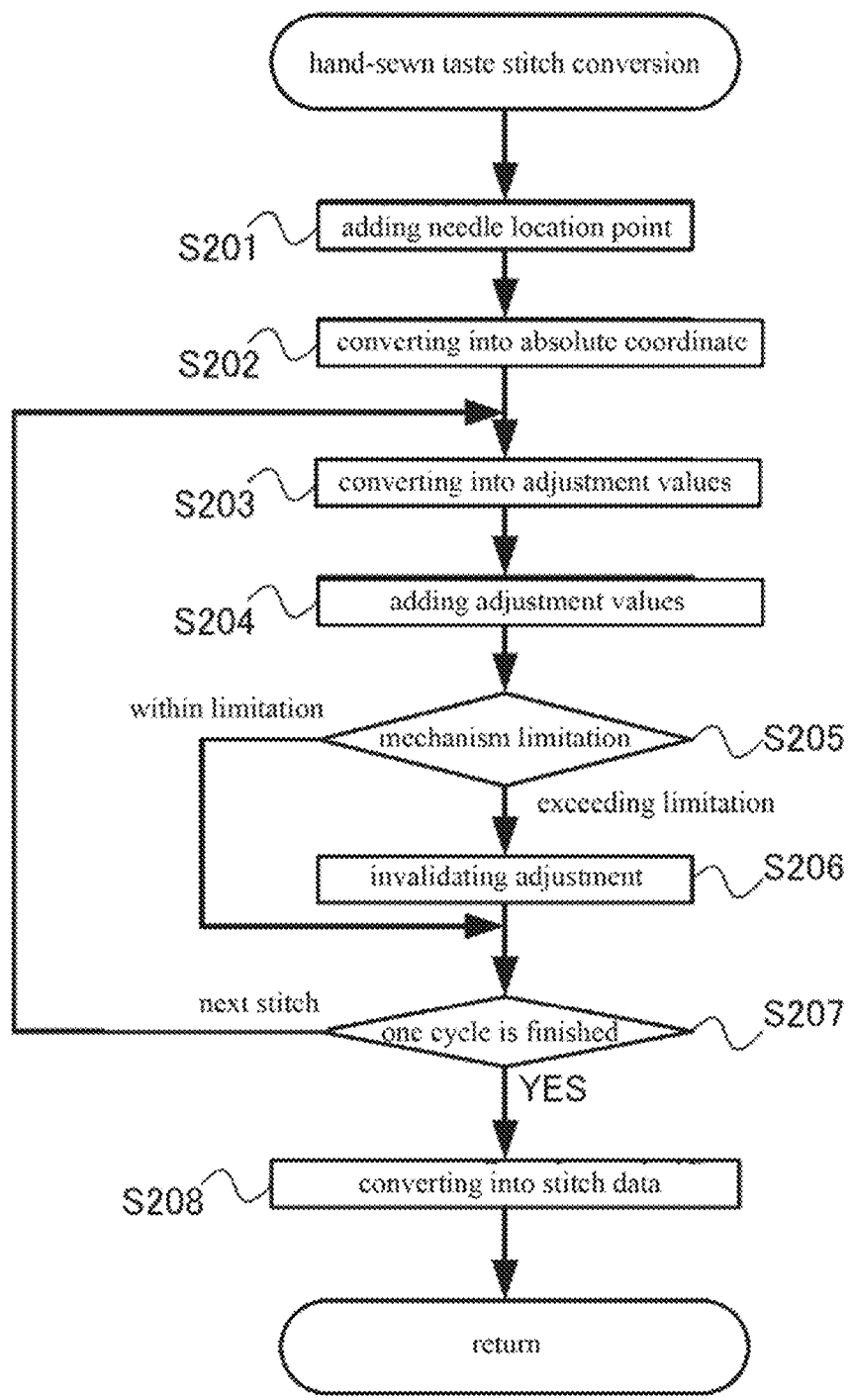
FIG. 4 is a processing flowchart related to a hand-sewn taste stitch conversion in the coordinate data creating device concerning an embodiment of the present invention.

The details of the screen operating processing and the hand-sewn taste stitch conversion processing in the coordinate data creating device 10 of the present embodiment will be explained by using FIG. 2 to FIG. 4.

<Screen Operating Processing>

The creation of the sewing data using the coordinate data creating device 10 of the present embodiment is performed by operating the screen displayed on the liquid crystal display 105 shown in FIG. 3.

Accordingly, before explaining the detailed processing of the coordinate data creating device 10, the details of the screen operating processing in the coordinate data creating device 10 of the present embodiment will be explained using FIG. 2.

When the display mode for displaying the operation screen shown in FIG. 3 on the liquid crystal display 105 is selected by the user, the central processing unit (CPU) 101 of the coordinate data creating device 10 first shifts the mode to the waiting mode for waiting the pressing of operation buttons, cursor moving buttons, pattern selection buttons and the like by a key input of the user (Step S101).

Then, the central processing unit (CPU) 101 determines whether or not the pattern is selected by the user (Step S102).

As a result of the determination, when the central processing unit (CPU) 101 determines that the pattern is selected by the user (i.e., the pattern number is inputted by the user, for example) ("Yes" in Step S102), the central processing unit (CPU) 101 determines whether the processing is the combination mode or the hand-sewn taste mode (Step S113).

In both of the processing of the combination mode and the processing of the hand-sewn taste mode, the processing is performed and the pattern is stored in the selected order.

In Step S102, as a result of the determination, when the central processing unit (CPU) 101 determines that the pattern is not selected by the user (i.e., the pattern number is not inputted by the user, for example) ("No" in Step S102) and the combination button is pressed ("Yes" in Step S103), the mode is set to the combination mode and the process is returned to Step S101 (Step S104).

On the other hand, when the central processing unit (CPU) 101 determines that the combination button is not pressed by the user in Step S103 ("No" in Step S103), the central processing unit (CPU) 101 determines whether or not the hand-sewn taste button is pressed by the user (Step S105).

When the central processing unit (CPU) 101 determines that the hand-sewn taste button is pressed by the user in Step S105 ("Yes" in Step S105), the mode is set to the hand-sewn taste mode and the process is returned to Step S101 (Step S106).

On the other hand, when the central processing unit (CPU) 101 determines that the hand-sewn taste button is not pressed by the user in Step S105 ("No" in Step S105), the central processing unit (CPU) 101 determines whether or not the cursor moving buttons are pressed by the user (Step S107).

When the central processing unit (CPU) 101 determines that the cursor moving buttons are pressed by the user in Step S107 ("Yes" in Step S107), the cursor is moved forward or backward for a line of the pattern stored in the ROM 102 and the process is returned to Step S101 (Step S108).

On the other hand, when the central processing unit (CPU) 101 determines that the cursor moving buttons are not pressed by the user in Step S107 ("No" in Step S107), the central processing unit (CPU) 101 determines whether or not the delete button is pressed by the user (Step S109).

When the central processing unit (CPU) 101 determines that the delete button is pressed by the user in Step S109 ("Yes" in Step S109), the pattern indicated by the cursor position is deleted, the following patterns are moved forward and the process is returned to Step S101 (Step S110).

On the other hand, when the central processing unit (CPU) 101 determines that the delete button is not pressed by the user in Step S109 ("No" in Step S109), the central processing unit (CPU) 101 determines whether or not the save button is pressed by the user (Step S111).

When the central processing unit (CPU) 101 determines that the save button is pressed by the user in Step S111 ("Yes" in Step S111), the pattern converted into the hand-sewn taste and the combination pattern are stored in the external medium 109 or the like so as to be used again and the process is returned to Step S101 (Step S112).

On the other hand, when the central processing unit (CPU) 101 determines that the save button is not pressed by the user in Step S111 ("No" in Step S111), the process is returned to Step S101.

When the central processing unit (CPU) 101 determines that the pattern selection buttons are pressed in the hand-sewn taste mode by the user in Step S113, the hand-sewn taste stitch conversion processing is called (Step S114).

Note that the details of the hand-sewn taste stitch conversion processing will be described later.

In Step S114, the converted hand-sewn taste stitch is controlled so that the directions (polarities) of the random number of two collective patterns are faced to each other based on the coordinate data of the final needle location point (end point) of the preceding collective pattern and the coordinate data of the first needle location point (first needle) of the succeeding collective pattern (Step S117).

Specifically, when the coordinate data of two sequential needle locations in the sewing order stored in the stitch data 102K storage unit in the ROM 102 (i.e., data storage unit) is the coordinate data of a final needle location of one collective pattern and the coordinate data of a first needle location of another collective pattern sewn immediately after the one collective pattern, a new coordinate data is created by adjusting the independent original values added respectively to the coordinate data of the final needle location of the one collective pattern and the coordinate data of the first needle location of the another collective pattern sewn immediately after the one collective pattern so that the direction of the independent original values added respectively to the coordinate data of the final needle location of the one collective pattern and the coordinate data of the first needle location of the another collective pattern sewn immediately after the one collective pattern are faced to each other. Thus, a connecting portion between the one collective pattern and the another collective pattern sewn immediately after the one collective pattern is connected smoothly.

More in detail, the direction of the adjustment value added to the coordinate data of the final needle location of the antecedently (previously) sewn collective pattern preceding is controlled to match (align) with the direction of the coordinate data of first needle location of the another collective pattern sewn immediately after the one collective pattern with respect to the final needle location of the one collective pattern. Similarly, the direction of the adjustment value added to the coordinate data of the first needle location of the subsequently sewn collective pattern is controlled to match (align) with the direction of the coordinate data of the final needle location of the one collective pattern sewn immediately before the another collective pattern with respect to the first needle location of the another collective pattern.

More preferably, the independent original value added to Y-coordinate value (i.e., amplitude direction) is adjusted in the independent original values.

When the Y-coordinate data of the final needle location of the one collective pattern and the Y-coordinate data of the first needle location of the subsequently sewn collective pattern are compared and one of them is located at the positive direction of the other, the adjustment value is adjusted to the positive direction. Similarly, when one of them is located at the negative direction of the other, the adjustment value is adjusted to the negative direction.

It is also possible to allow the user to set the independent original values so that a connecting portion between one collective pattern and another collective pattern sewn immediately after the one collective pattern is connected smoothly.

Here, "collective pattern" means the pattern giving a collected (gathered, united) impression as a whole pattern. It includes not only the pattern formed by a large number of needle location points but also the pattern formed by a small number of needle location points for connecting the patterns formed by a large number of needle location points.

On the other hand, when the central processing unit (CPU) 101 determines that the combination mode button is pressed by the user in Step S113 ("Yes" in Step S113) or when the hand-sewn taste stitch conversion processing (Step S114) and the sequential pattern fluctuation processing (Step S117) are finished, the pattern data is combined similar to the combination of the normal pattern (Step S115).

Then, the central processing unit (CPU) 101 displays the preview screen on the liquid crystal display 105 in Step S116.

Consequently, the user can check the converted state.

Note that the editing operations such as deletion and addition are possible since the patterns converted by the hand-sewn taste mode are equally treated as the normal patterns.

<Hand-Sewn Taste Stitch Conversion Processing>

The hand-sewn taste stitch conversion processing where the direction of the fluctuation is adjusted will be explained by using FIG. 4.

First, a plurality of patterns is fluctuated by using different random number for each pattern and the plurality of patterns is combined.

After the plurality of patterns is combined, the user presses the pattern selection button on the operation screen for storing the combination of the patterns.

When the user presses the pattern selection button on the operation screen, a new random number is generated. Thus, the pattern is differently fluctuated (displaced) to form the combination pattern each time when the user selects the pattern.

When the final needle location (end position of sewing) of the preceding collective pattern and the later described first needle location point (start position of sewing) of the succeeding collective pattern are grasped and the connecting portion between the preceding collective pattern and the succeeding collective pattern is located at one (same) position, the needle location points are controlled so that the connecting portion is located at the same position after the conversion processing.

While the end position of sewing of the preceding collective pattern and the start position of sewing of the succeeding collective pattern are grasped, the needle location points are controlled so that the needle location points of the two needle location points are not directed in a direction opposite to each other (in the direction separated from each other) after the conversion processing.

More specifically, when the coordinate data of two sequential needle locations in the sewing order stored in the stitch data 102K storage unit in the ROM 102 (i.e., data storage unit) is the coordinate data of a final needle location of one collective pattern and the coordinate data of a first needle location of another collective pattern sewn immediately after the one collective pattern, a new coordinate data is created by adjusting the independent original values added respectively to the coordinate data of the final needle location of the one collective pattern and the coordinate data of the first needle location of the another collective pattern sewn immediately after the one collective pattern so that the direction of the independent original values added respectively to the coordinate data of the final needle location of the one collective pattern and the coordinate data of the first needle location of the another collective pattern sewn immediately after the one collective pattern are faced to each other. Thus, a connecting portion between the one collective pattern and the another collective pattern sewn immediately after the one collective pattern is connected smoothly.

More specifically, the direction of the adjustment value added to the coordinate data of the final needle location of the antecedently (previously) sewn collective pattern is controlled to match (align) with the direction of the coordinate data of first needle location of the subsequently sewn collective pattern sewn immediately after the antecedently sewn collective pattern with respect to the final needle location of the antecedently sewn collective pattern. Similarly, the direction of the adjustment value added to the coordinate data of the first needle location of the subsequently sewn collective pattern is controlled to match (align) with the direction of the coordinate data of the final needle location of the antecedently sewn collective pattern sewn immediately before the subsequently sewn collective pattern with respect to the first needle location of the subsequently sewn collective pattern.

More preferably, the independent original value added to Y-coordinate value (i.e., amplitude direction) is adjusted in the independent original values to create a new coordinate data.

The Y-coordinate data of the final needle location of the antecedently sewn collective pattern and the Y-coordinate data of the first needle location of the subsequently sewn collective pattern are compared. When one of them is located at the positive direction of the other, the adjustment value is adjusted to the positive direction. Similarly, when one of them is located at the negative direction of the other, the adjustment value is adjusted to the negative direction.

It is also possible to allow the user to set the independent original values so that a connecting portion between one collective pattern and another collective pattern sewn immediately after the one collective pattern is connected smoothly.

Here, "collective pattern" means the pattern giving a collected (gathered, united) impression as a whole pattern. It includes not only the pattern formed by a large number of needle location points but also the pattern formed by a small number of needle location points for connecting the patterns formed by a large number of needle location points.

The user adopts (selects) the preferably displaced pattern of the outer appearance of the converted stitch data from the preview screen displayed on the liquid crystal display 105.

Note that the combination patterns can be edited (e.g., deleted, re-converted) on the screen when the user thinks the converted combination pattern is not preferable.

It is also possible to select whether the needle location points are fluctuated by the random number or by the table.

Hereafter, the details of the hand-sewn taste stitch conversion processing will be explained.

<Details of Processing of Hand-Sewn Taste Stitch Conversion>

In order to perform the processing, as an initial operation, the user presses "hand-sewn taste" button on the operation screen displayed on the liquid crystal display 105 shown in FIG. 3 to select the combination mode of the hand-sewn taste.

Then, the user presses the pattern selection buttons to select the pattern.

First, the central processing unit (CPU) 101 of the coordinate data creating device 10 generates a coordinate data corresponding to a new needle location between the coordinate data corresponding to two sequential needle location points in the sewing order when the distance between the two sequential needle location points is longer than the predetermined distance in the original stitch data 102K stored in the ROM 102 (Step S201).

The central processing unit (CPU) 101 of the coordinate data creating device 10 converts the stitch data 102K to which the coordinate data is added in Step S201 into the data string indicated as the absolute coordinate by an accumulation processing of the relative feeding amount (Step S202). Note that the feeding direction is indicated as the relative moving amount in the stitch data 102K.

The central processing operation unit (CPU) 101 acquires two random numbers respectively for the amplitude and the feeding.

Since the acquired random numbers are integrals, they are converted into the adjustment values within the range of ±1.0 mm (Step S203).

The central processing unit (CPU) 101 adds the adjustment values converted in Step S203 to the coordinates of the amplitude direction and the feeding direction for finely adjusting the coordinates (Step S204).

However, since the coordinates cannot be finely adjusted exceeding the limit value of the mechanism, the central processing unit (CPU) 101 invalidates the finely adjusted processing of Step S204 when the finely adjusted coordinate data exceeds the limitation of the mechanism in the feeding (X-coordinate) direction or in the amplitude (Y-coordinate) direction (Step S206). Specifically, whether or not the distance between the X-coordinate value of the finely adjusted coordinate data of a certain needle location point and the X-coordinate value of the neighboring finely adjusted coordinate data in the sewing order is within the limitation of the feeding mechanism is determined (Step S205).

As for the amplitude, whether or not the Y-coordinate value of the finely adjusted coordinate data is within the limitation of the amplitude mechanism is determined (Step S205).

In case of the coordinate data of the final needle location of one collective pattern and the coordinate data of the first needle location of another collective pattern sewn immediately after the one collective pattern, Step S205 and Step S206 can be skipped since it is not assumed that the adjusted coordinate data exceeds the limitation of the mechanism when the sequential pattern fluctuation processing (Step S117) is performed later.

Here, the value of the limitation of the mechanism in the amplitude direction can be −4.4 mm or +4.4 mm, for example, and the value of the limitation of the mechanism in the feeding direction can be −5.0 mm or +5.0 mm as the relative moving amount, for example.

Although the above described explanation is related to the limitation in the normal sewing, the finely adjusted processing of Step S204 is invalidated even in the embroidery sewing when the value of the finely adjusted coordinate data exceeds the limitation of the mechanism in the X-coordinate direction or in the Y-coordinate direction (Step S206).

Although not illustrated, it is also possible to generate the adjustment value again and the finely adjusted processing is performed within the range of the limitation of the mechanism.

On the other hand, when the finely adjusted coordinates in the amplitude direction and in the feeding direction do not exceed the limitation of the mechanism, the process is shifted to Step S207.

The central processing unit (CPU) 101 determines whether or not one cycle of the stitch is finished (Step S207).

When the central processing unit (CPU) 101 determines that the stitch still remains and one stitch is not finished, the process is returned to Step S203.

In this case, the central processing unit (CPU) 101 generates a new random value for the next needle location point and Step S203 and the following procedures are performed.

On the other hand, when the central processing unit (CPU) 101 determines that one cycle is finished ("Yes" in Step S207), the feeding data indicated as the absolute coordinate is converted into the relative moving amount to return to the original format of the stitch data (Step S208).

Then, all processes are finished.

<Operation and Effect>

As explained above, in the present embodiments, in a coordinate data creating device of a sewing machine 10 for creating coordinate data composed of an X-coordinate value and a Y-coordinate value of a needle location of a pattern to be sewn, the coordinate data creating device 10 including: a data storage unit (ROM 102) configured to store a sewing order and the coordinate data of the needle location in association with each other; and an added coordinate data creating unit (sequential pattern fluctuation processing module 102M) configured to create a new coordinate data by adding independent original values respectively to the X-coordinate value or the Y-coordinate value in each of the coordinate data stored in the data storage unit (ROM 102), wherein when the coordinate data of two sequential needle locations in the sewing order stored in the data storage unit (ROM 102) is the coordinate data of a final needle location of one collective pattern and the coordinate data of a first needle location of another collective pattern sewn immediately after the one collective pattern, the added coordinate data creating unit (sequential pattern fluctuation processing module 102M) is configured to create the new coordinate data by adjusting the independent original values added respectively to the coordinate data of the final needle location of the one collective pattern and the coordinate data of the first needle location of the another collective pattern sewn immediately after the one collective pattern so that a connecting portion between the one collective pattern and the another collective pattern sewn immediately after the one collective pattern is connected smoothly.

Namely, when the coordinate data of two sequential needle locations in the sewing order stored in the data storage unit (ROM 102) is the coordinate data of the final needle location of one collective pattern and the coordinate data of the first needle location of another collective pattern sewn immediately after the one collective pattern, the new coordinate data is created by adjusting the independent original values added respectively to the coordinate data of the final needle location of the one collective pattern and the coordinate data of the first needle location of the another collective pattern sewn immediately after the one collective pattern so that a connecting portion between the one collective pattern and the another collective pattern sewn immediately after the one collective pattern is connected smoothly.

More specifically, the needle location points are controlled so that the directions of the independent original values added respectively to the end position of sewing of the preceding collective pattern and the start position of sewing of the succeeding collective pattern are faced to each other while grasping the end position of sewing of the preceding collective pattern and the start position of sewing of the succeeding collective pattern.

Consequently, the coordinate data to which each of the independent adjustment values is added are come close to each other and the connecting portion between the collective patterns becomes smoother.

Accordingly, a hand-drawn taste is created in the sewing pattern by adding an appropriate fluctuation to each stitch and the seam imparting comfort and warmth can be formed. In addition, the combination pattern formed of a plurality of collective patterns can be formed while a connecting portion between the plurality of collective patterns is naturally fluctuated.

Furthermore, the added coordinate data creating unit adjusts the independent original value added to Y-coordinate value in the independent original values.

In the viewpoint of forming natural fluctuation of the connecting portion between the collective patterns, it is considered that the influence is greater when the independent value added to the Y-coordinate value (i.e., amplitude direction) makes the needle location point in the opposite direction after the conversion process compared to the case when the independent value added to the X-coordinate value (i.e., feed direction) makes the needle location point in the opposite direction after the conversion process.

Accordingly, when the added coordinate data creating unit adjusts the independent original value added to Y-coordinate value in the independent original values, a hand-drawn taste is created in the sewing pattern by adding an appropriate fluctuation to each stitch and the seam imparting comfort and warmth can be formed and the combination pattern formed of a plurality of collective patterns can be formed while a connecting portion between the plurality of collective patterns is naturally fluctuated.

Furthermore, the coordinate data creating device 10 includes a setting unit configured to set the independent original values so that the connecting portion between the one collective pattern and the another collective pattern sewn immediately after the one collective pattern is connected smoothly.

The appropriate degree of the fluctuation for making the user feel that the connecting portion between the collective patterns is natural varies depending on the feeling of each user.

However, the coordinate data creating device 10 of the present embodiment includes a setting unit configured to set the independent original values so that the connecting portion between the one collective pattern and the another collective pattern sewn immediately after the one collective pattern is connected smoothly. Thus, the user can set the independent original values by the setting unit, for example. Accordingly, the image after the setting is displayed on the liquid crystal display 105 and the independent original values can be set depending on the feeling of each user.

First Example

The first example of the present invention will be explained using FIG. 5 to FIG. 9.

In some types of the sewing data, the pattern may be formed by connecting different pattern by an operator.

Figure 5:
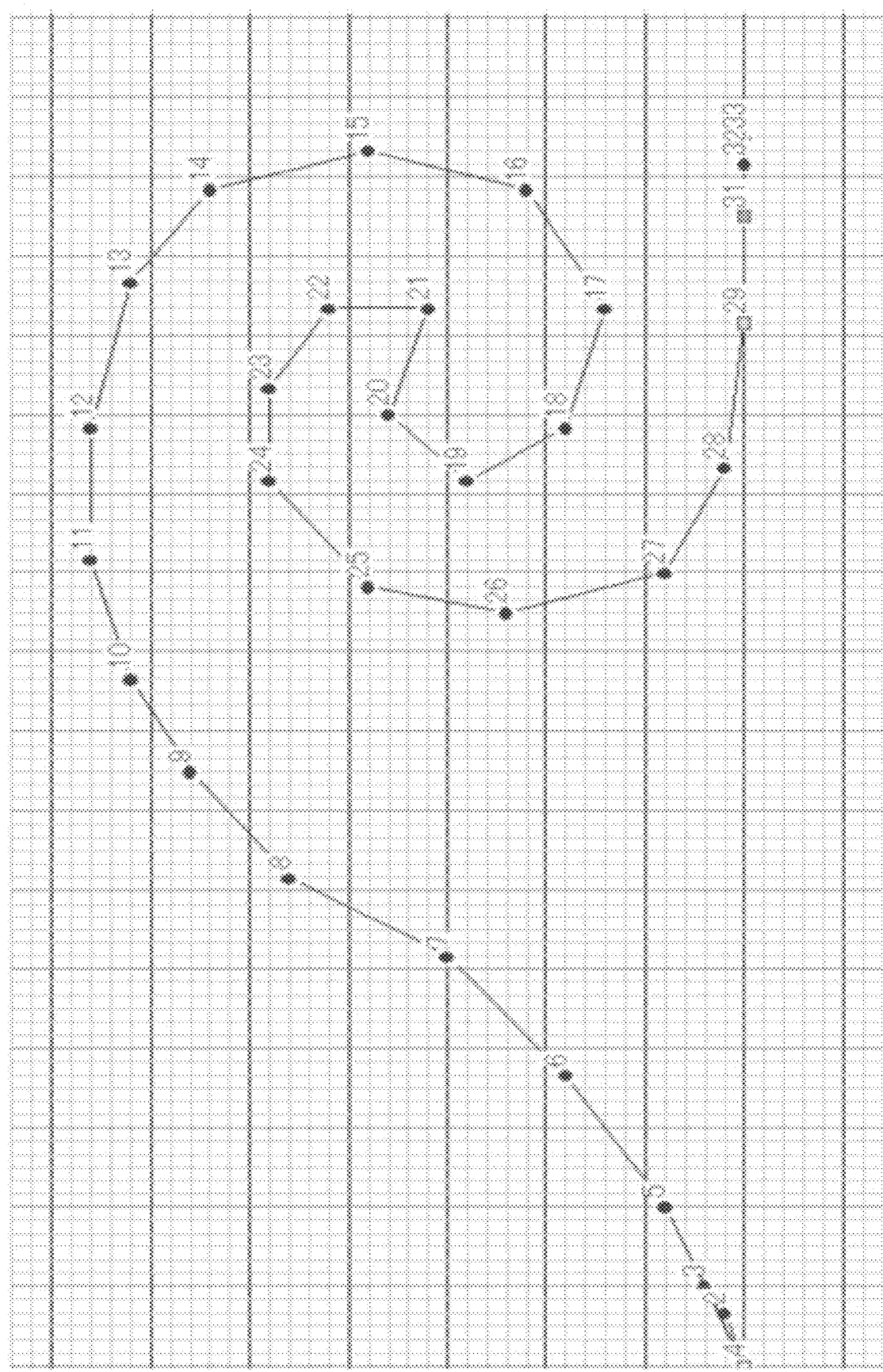
FIG. 5 is a drawing illustrating the needle location points of the preceding pattern in the coordinate data creating device concerning the first example of the present invention.
Figure 6:
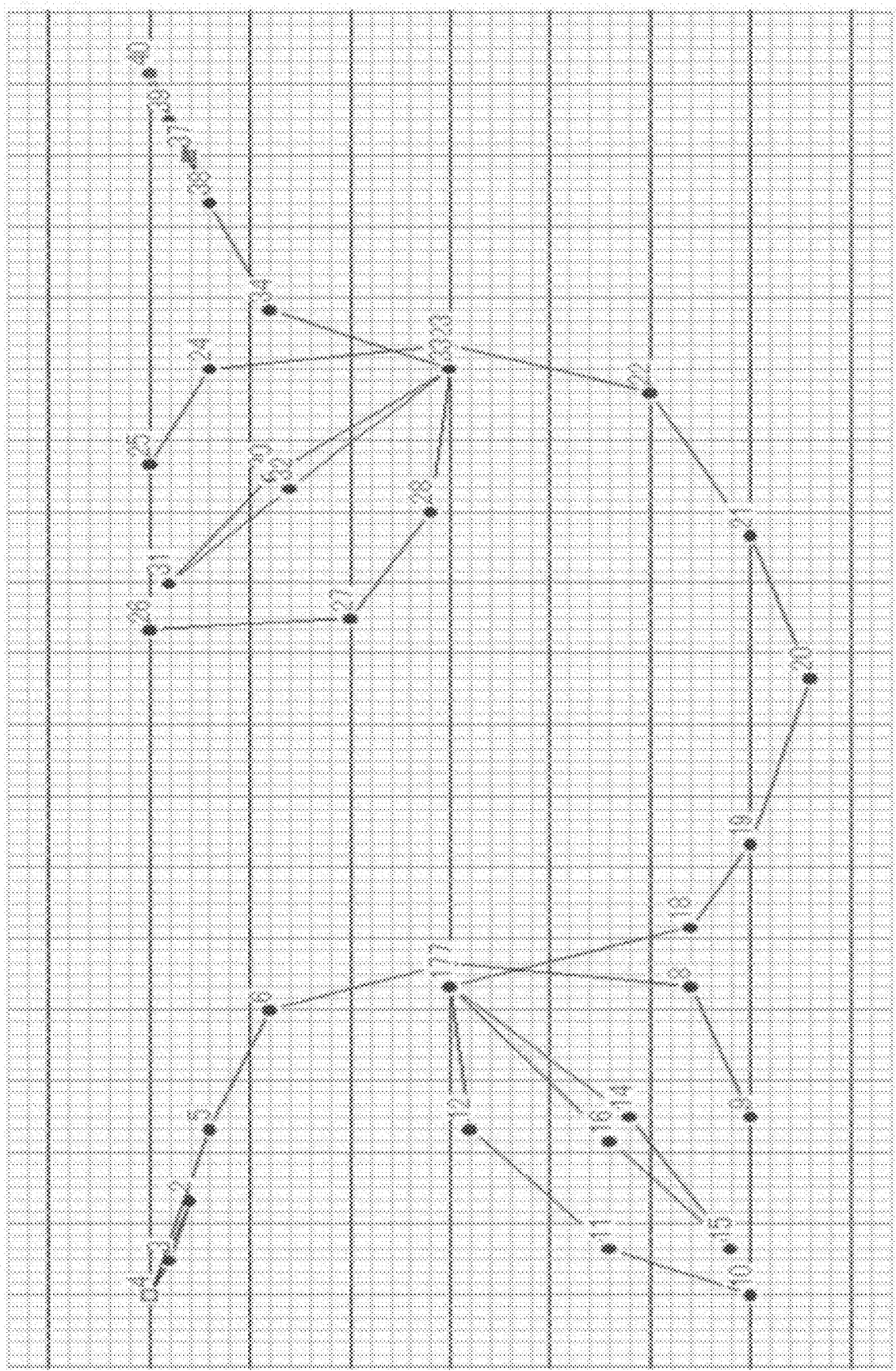
FIG. 6 is a drawing illustrating the needle location points of the succeeding pattern in the coordinate data creating device concerning the first example of the present invention.
Figure 7:
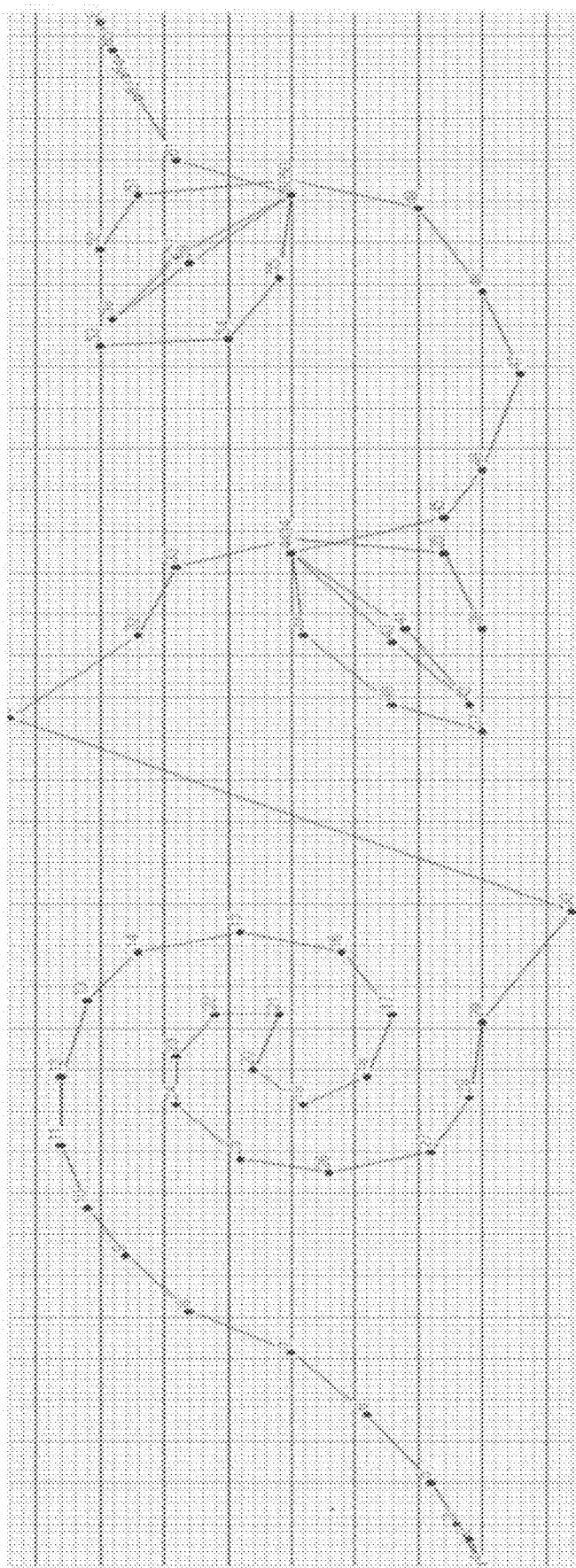
FIG. 7 is a drawing illustrating the needle location points where the preceding pattern shown in FIG. 5 and the succeeding pattern shown in FIG. 6 are combined in the coordinate data creating device concerning the first example of the present invention.

For example, in case of the pattern shown in FIG. 5 where the final needle location point of the preceding pattern (e.g., FIG. 5) and the first needle location point of the succeeding pattern (e.g., FIG. 6) are different, the sewing image shown in FIG. 7 is formed unless a special processing is performed for the final needle location point of the preceding pattern and the first needle location point of the succeeding pattern. In that case, the connecting portion between the two points becomes linear and looks unnatural.

Accordingly, in the present embodiment, the random values are adjusted each for the amplitude value of the end point of the preceding pattern and the amplitude value of the start point of the succeeding pattern so that the two points are not fluctuated in a direction opposite to each other.

Specifically, since the first needle location point of the pattern (B) is located at the right direction with respect to the end point of the pattern (A), the adjustment value added to the end point of the pattern (A) is controlled to direct in the right direction. Similarly, since the end point of the pattern (A) is located at the left direction with respect to the first needle location point of the pattern (B), the adjustment value added to the first needle location point of the pattern (B) is controlled to direct in the left direction.

Figure 8A:
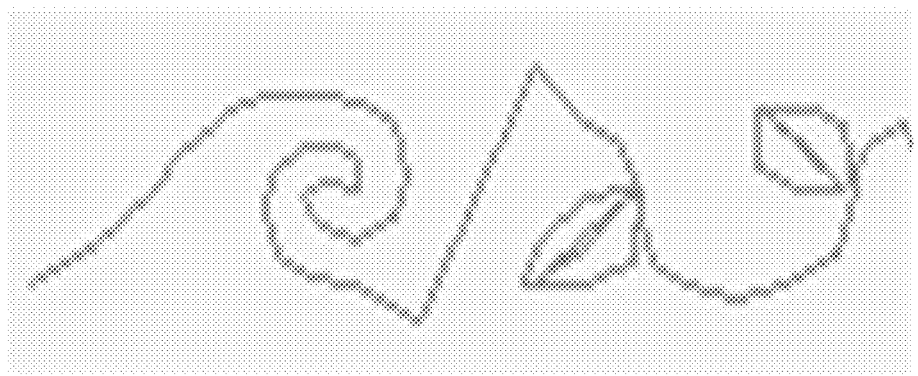
FIGS. 8A and 8B are drawings illustrating the combination pattern of the preceding and succeeding patterns to which the coordinate adjustment is added by random number in the combination pattern shown in FIG. 7 in the coordinate data creating device concerning the first example of the present invention.
Figure 8B:
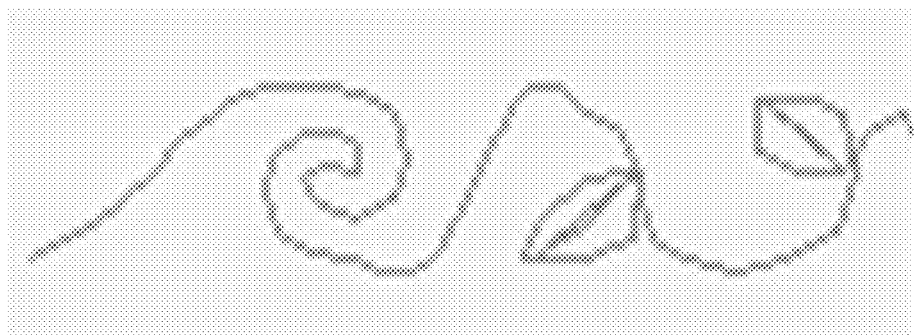

By the above described process, the connecting portion between the two points becomes smooth as shown in FIG. 8B although the connecting portion becomes linear and looks unnatural in the combination pattern shown in FIG. 8A.

In addition when the lateral positions of the end point of the pattern (A) and the first needle location point of the pattern B are significantly different from each other as shown in FIG. 5, the distance between the two points becomes large.

In that case, even if the direction of the adjustment values added respectively to the two points is adjusted, the connecting portion between the two points becomes linear.

Figure 9:
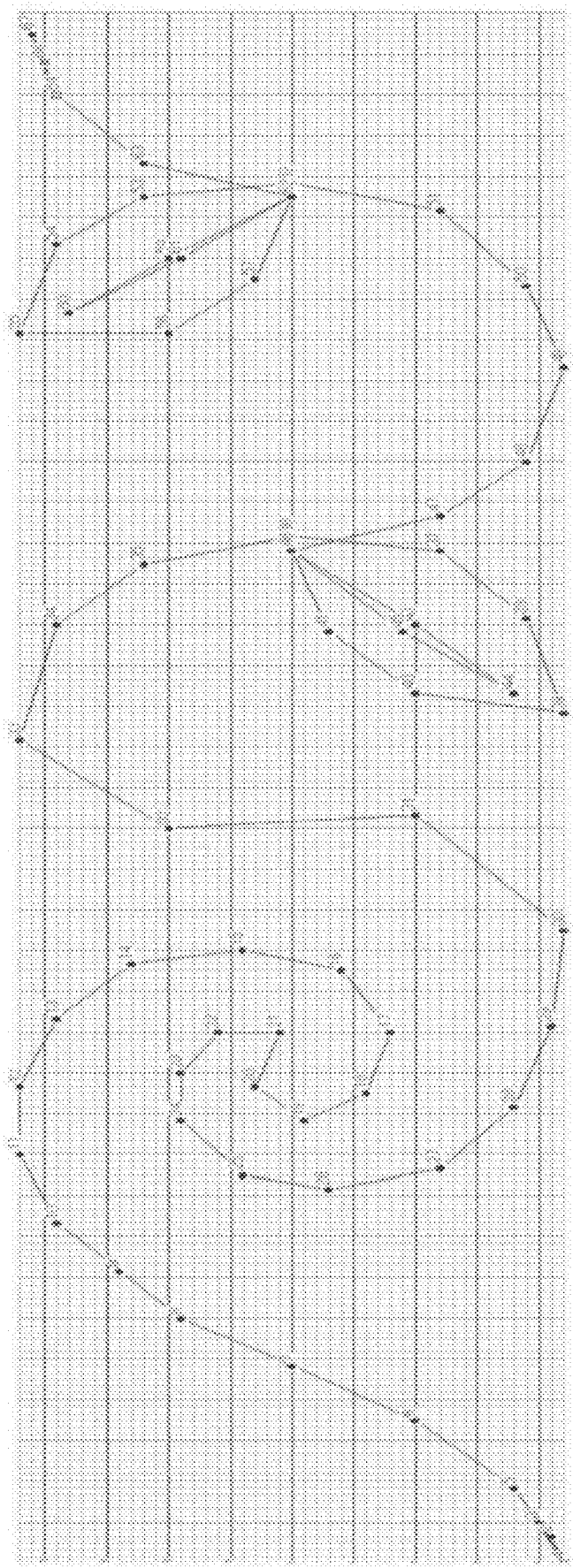
FIG. 9 is a drawing illustrating the combination pattern where the needle location points are added and the coordinate adjustment is added by random number in the combination pattern shown in FIG. 7 in the coordinate data creating device concerning the first example of the present invention.

Accordingly, as shown in FIG. 9, it is possible to add needle location points between the two points and then generating the fluctuation so that the connecting portion becomes smoother.

Even when the preceding pattern and the succeeding pattern are the same pattern, the start position and the end position may be different and the distance between the two positions may become large. Accordingly, the present embodiment is also applicable when the preceding pattern and the succeeding pattern are the same pattern in addition to the case the preceding pattern and the succeeding pattern are different from each other.

Note that the coordinate data creating device 10 of the present invention can be achieved by recording the processing of the coordinate data creating device 10 on a computer system or a computer readable recording medium and reading and executing the program recorded in the recording medium by the coordinate data creating device 10.

Here, the computer system or the computer includes an OS (operating system) and hardware such as a peripheral device.

When the WWW (World Wide Web) system is used, "the computer system or the computer" includes a providing environment (or display environment) of the webpage.

The program can be transferred from the computer system or the computer which stores the program in the storage unit or the like to other computer systems or computers via a transmission media or via transmission waves in the transmission media.

Here, "the transmission media" for transmitting the program is the media having a function of transmitting information. For example, "the transmission media" is a network (communication network) such as Internet and a communication line (communication wire) such as telephone wire.

It is also possible to achieve only a part of the above described functions by the program.

It is also possible to achieve the above described functions by combining the above described program with the programs already stored in the computer system or the computer. Namely, the program can be so-called a difference file (difference program).

Although the embodiments of the present invention are explained above with reference to drawings, the specific configuration is not limited to the above described embodiments. The specification can be changed within a range being not deviated from the subject-matter of the present invention.

For example, the coordinate data creating device 10 can be a separately provided device such as a personal computer and a device included in the sewing machine or the like.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A coordinate data creating device of a sewing machine for creating coordinate data composed of an X-coordinate value and a Y-coordinate value of a needle location of a pattern to be sewn, the coordinate data creating device comprising:

a data storage unit configured to store a sewing order and the coordinate data of the needle location in association with each other; and an added coordinate data creating unit configured to create a new coordinate data by adding independent original values to the X-coordinate value or the Y-coordinate value in each of the coordinate data stored in the data storage unit, wherein when the coordinate data of two sequential needle locations in the sewing order stored in the data storage unit is the coordinate data of a final needle location of one collective pattern and the coordinate data of a first needle location of another collective pattern sewn immediately after the one collective pattern, the added coordinate data creating unit is configured to create the new coordinate data by adjusting the direction of the independent original values added respectively to the coordinate data of the final needle location of the one collective pattern based on the direction of the coordinate data of the first needle location of the another collective pattern sewn immediately after the one collective pattern with respect to the final needle location of the one collective pattern and adjusting the direction of the independent original values added respectively to the coordinate data of the first needle location of the another collective pattern sewn immediately after the one collective pattern based on the direction of the coordinate data of the final needle location of the one collective pattern with respect to the first needle location of the another collective pattern.

2. The coordinate data creating device according to claim 1, wherein
the added coordinate data creating unit is configured to adjust an independent original value added to Y-coordinate value in the independent original values.

3. The coordinate data creating device according to claim 1, further comprising:
a setting unit configured to set the independent original values so that the connecting portion between the one collective pattern and the another collective pattern sewn immediately after the one collective pattern is connected smoothly.

4. A sewing machine having the coordinate data creating device according to claim 1.

5. A non-transitory computer readable medium having stored thereon a program for executing a coordinate data creating method of a coordinate data creating device of a sewing machine for creating coordinate data composed of an X-coordinate value and a Y-coordinate value of a needle location of a pattern to be sewn, the coordinate data creating device comprising:

a data storage unit configured to store a sewing order and the coordinate data of the needle location in association with each other; and an added coordinate data creating unit configured to create a new coordinate data by adding independent original values to the X-coordinate value or the Y-coordinate value in each of the coordinate data stored in the data storage unit, wherein when the coordinate data of two sequential needle locations in the sewing order stored in the data storage unit is the coordinate data of a final needle location of one collective pattern and the coordinate data of a first needle location of another collective pattern sewn immediately after the one collective pattern, the added coordinate data creating unit is configured to create the new coordinate data by adjusting the direction of the independent original values added respectively to the coordinate data of the final needle location of the one collective pattern based on the direction of the coordinate data of the first needle location of the another collective pattern sewn immediately after the one collective pattern with respect to the final needle location of the one collective pattern and adjusting the direction of the independent original values added respectively to the coordinate data of the first needle location of the another collective pattern sewn immediately after the one collective pattern based on the direction of the coordinate data of the final needle location of the one collective pattern with respect to the first needle location of the another collective pattern.

* * * * *